Dec. 31, 1929.    H. BUSIGNIES    1,741,282
RADIO DIRECTION FINDER, HERTZIAN COMPASS, AND THE LIKE
Filed Feb. 18, 1927    3 Sheets-Sheet 1
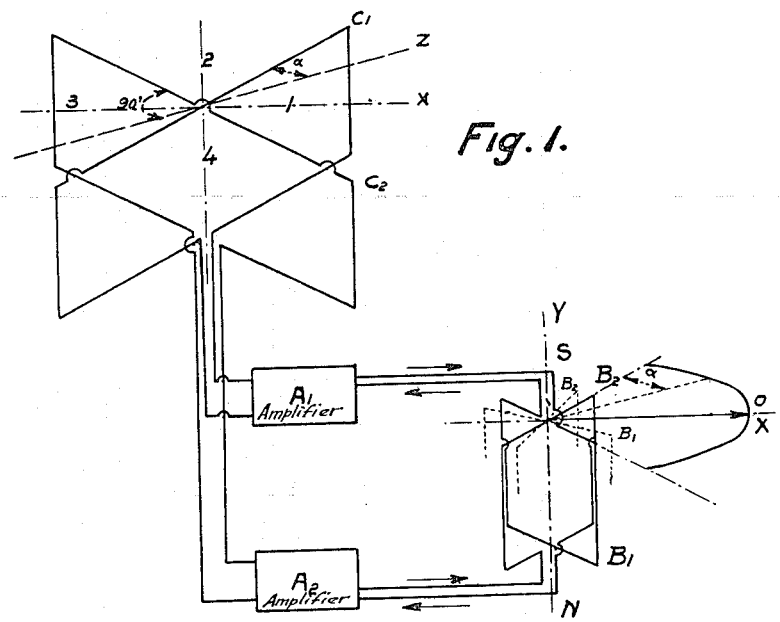
Fig. 1.
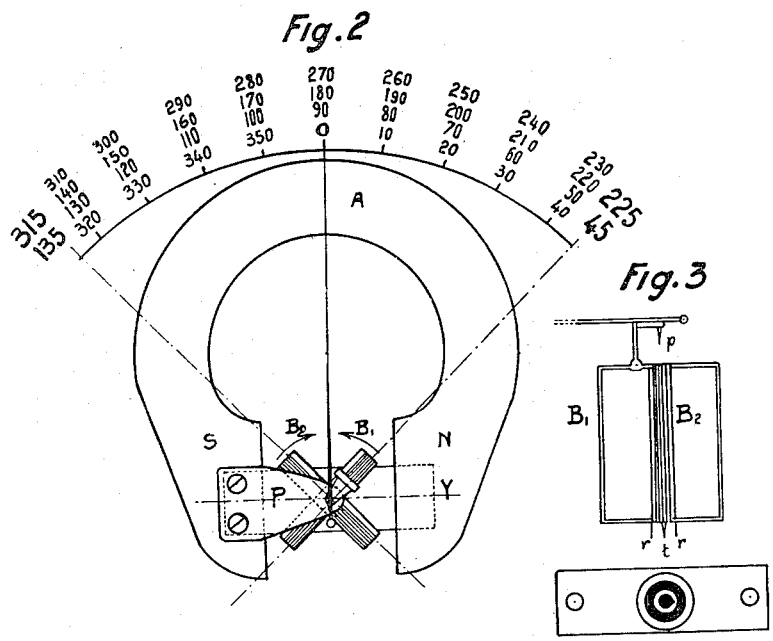
Fig. 2
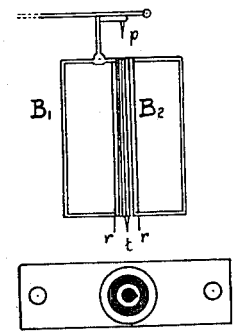
Fig. 3
Fig. 4
INVENTOR
Henri Busignies
By Robb & Robb
Attorneys.

Dec. 31, 1929.  H. BUSIGNIES  1,741,282
RADIO DIRECTION FINDER, HERTZIAN COMPASS, AND THE LIKE
Filed Feb. 18, 1927  3 Sheets-Sheet 3
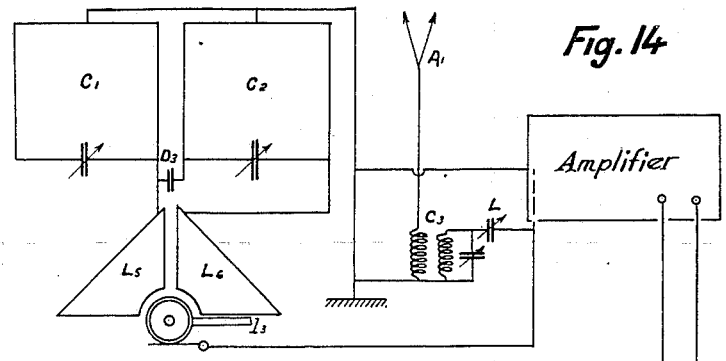
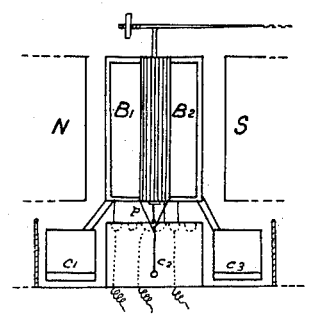
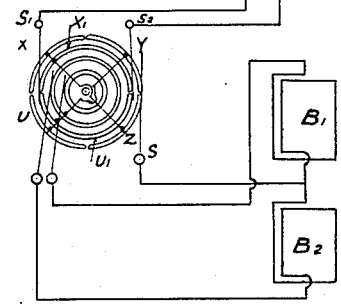
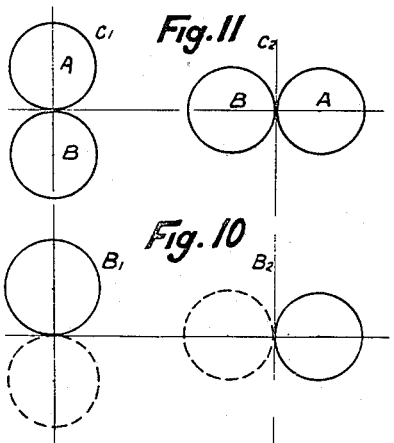
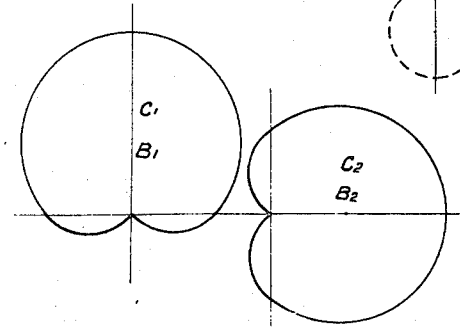
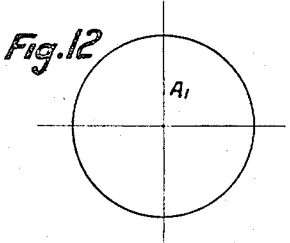
INVENTOR
Henri Busignies
By Robb & Robb
Attorneys Patented Dec. 31, 1929

1,741,282

UNITED STATES PATENT OFFICE

HENRI BUSIGNIES, OF ST. CLOUD, FRANCE

RADIO DIRECTION FINDER, HERTZIAN COMPASS, AND THE LIKE

Application filed February 18, 1927, Serial No. 169,310, and in France February 20, 1926.

This invention relates to radio direction finders, Hertzian compasses and the like.

Known radiogoniometric receivers require an operator to manipulate the receiving frame in order to find the direction of the incoming signal. Known apparatus have also the defect that the azimuth is noted at the point of zero reception and the constant presence of an operator is necessary to read the position of zero reception in case of displacement of the receiver with respect to the emitter.

The object of the present invention is to provide a Hertzian compass which indicates by the action of a needle over a frame the direction of an electromagnetic field due to an emitting station whose waves are received by the said compass.

Figure 5:
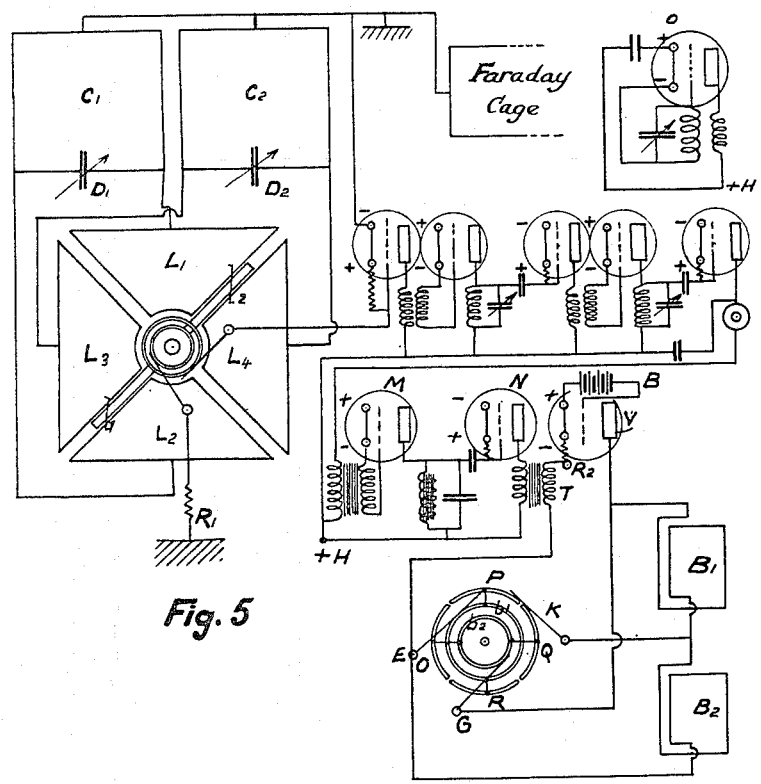
Figures 6, 7:
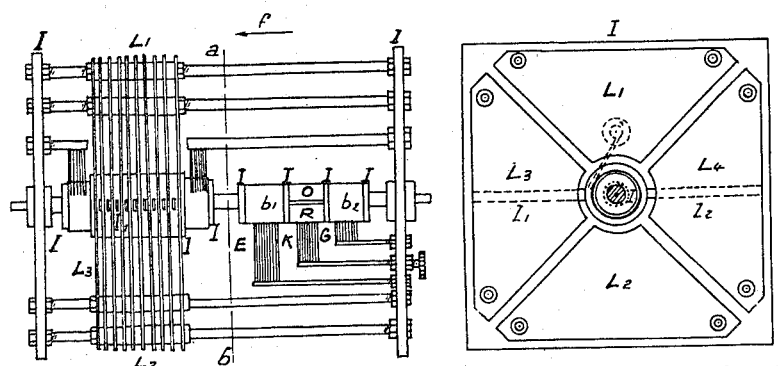

The invention is illustrated in the accompanying drawings of which Figure 1 is a schematic diagram. Figure 2 shows an arrangement of the Hertzian compass with its frame; Figure 3 is a side view of a galvanometric frame with suitable contacts; Figure 4 is a plan view of mercury cups employed for two of the preceding contacts; Figure 5 is a diagram showing improvements applied to the preceding arrangement; Figure 6 shows a commutator arrangement; Figure 7 is a section on the line $a$—$b$ of Fig. 6 with a view as indicated by the arrow $f$. Figure 8 illustrates a mechanical arrangement of the galvanometric indicator apparatus; Figure 9 shows an arrangement of concentric mercury cups. Figure 10 shows two polar diagrams of the currents in the frames $B_1$ $B_2$ as functions of the azimuths. Figure 11 shows the polar diagrams of two H. F. currents received in the frames $C_1$ $C_2$ as functions of the azimuth of the emitter. Figure 12 represents the diagram of reception of the antenna. Figure 13 shows polar diagrams obtained by composing the voltages and the phases of one frame and by composing the voltages and the phases of a frame and of the antenna then of the other frame and of the antenna. Figure 14 represents a diagram with a fixed antenna $A_1$ and two frames $C_1$ $C_2$ employing a rotating commutator.

Referring to Figure 1, $C_1$ and $C_2$ are two identical vertical mutually perpendicular frames cut by an electromagnetic field of direction Z making an angle $\alpha$ with the frame $C_1$ as shown. The electromotive forces induced will be proportional to $\cos \alpha$ in the frame $C_1$ and to $\sin \alpha$ in the frame $C_2$.

If each frame is closed upon an amplifying detector then as the characteristics of these two apparatus are substantially equal and such that the direct currents derived from the detection of the electromotive forces received in the frames are substantially proportional to these electromotive forces, there will be at the output from the amplifying detector $A_1$, branched on the frame $C_1$, a direct current proportional to $\cos \alpha$ and at the output from the amplifyer detector $A_2$, branched on the frame $C_2$, a current proportional to $\sin \alpha$.

Let two identical ordinary galvanometric frames perpendicular to one another and pivoting around the same vertical axis be placed in a continuous magnetic field NS whose direction Y is perpendicular to the bisecting line X of the right angle formed by the frames $C_1$ and $C_2$ and perpendicular also to the axis of the frames; the current from $A_1$ sent into $B_1$ acting alone will tend to displace $B_1$ in the direction of the arrow up to the limiting position at right angles to the magnetic field Y; the current from $A_2$ sent into $B_2$ acting alone will tend to displace $B_2$ in the direction of the arrow up to the limiting position at right angles to the magnetic field Y. As the currents act simultaneously and the magnetic fields due to $B_1$ and to $B_2$ and respectively proportional to $\cos \alpha$ and to $\sin \alpha$ will compose into a resultant field which will be in opposition to the fixed magnetic field Y; the bisecting needle of $B_1$, $B_2$, will indicate an angle counted from left to right with respect to its limiting left-hand position it will therefore be in a direction parallel to that of the alternating electro-magnetic field Z whose direction is desired to be known.

It will be seen from Figure 1. given for making the principle of the invention understood, that so long as the electromagnetic field Z has a direction comprised within the sectors 1 and 3, the needle of the Hertzian compass indicates a parallel direction over the graduated dial plate but if the field Z has a direction comprised within the sectors 2 and 4, the needle will no longer indicate a direction parallel to that of the field Z, but the direction of the field Z in degrees over a second graduation of directions of the dial plate.

Figure 2 illustrates an arrangement of such frame. It is therefore necessary to select from the indication of the needle the true direction of the field Z. Let it be supposed that the needle is at zero, it is therefore necessary to select between the directions 0°–180° and 80°–270°. For this purpose it is sufficient slightly to turn the two frames $C_1$, $C_2$ fast with each other, about their common vertical axis. If the needle of the Hertzian compass turns in opposite direction, the field Z is comprised within the sector 1 and 3 and 0°–180° must be read, if the needle turns in the same direction the field Z is comprised within the sectors 2 and 4 and 90°–270° must be read. The frames must of course be brought back after this operation to their initial position. This is for the reading of the direction of the field Z, but in radiotelegraphic applications in general the direction of the emitter is sought for which is normal to that of the electromagnetic field. In order that the conditions of reading over the dial plate given above can remain valid, it is sufficient to send the current from $A_1$ in the coil $B_2$ and the current from $A_2$ in the coil $B_1$.

Reading in the direction of the emitter is given by merely taking the reverse of the conditions before set out but it is preferable in arrangements for obtaining readings of the directions of the emitter to mount the galvanometric frames as has been described so that when the direction of the emitter is comprised in the sectors 1 and 3, the needle of the Hertzian compass indicates effectively this direction in space, which is very desirable for purposes of navigation where it is desired mainly to maintain the direction of movement in the direction of the emitter. As an example, Figs. 2, 3, and 4 represents an arrangement of Hertzian compass. Frames $B_1$, $B_2$, are placed in a magnetic field Y produced by a magnet A which may in some cases be an electromagnet. In order to lead currents into the frames three contacts are required and one of these may be common to the two frames. The first contact is made by a metallic point $p$ shown in Fig. 3, which is a side view of the galvanometric frames, such point resting in a recession of the piece P, and in the vertical axis of the frames (Fig. 2). The second contact is made by a very fine metallic point $t$ also in the axis of the small insulated cup containing mercury. The third contact is made by two very fine points $r$ diametrically opposite each other with respect to the axis and plunged into a cup in the form of a crown concentric to the former and containing mercury.

Fig. 4 is a plan of such arrangement; this piece being fixed after the magnet as is the piece P. The movable assemblage, consisting of the needle and its counterweight is perfectly balanced. The frame is shown by its graduation.

This arrangement has the defect of employing two amplifying detectors which can never be tuned in an absolutely identical manner, mainly when receiving fields of high frequency and which possess different characteristics of amplification and detection.

To avoid this, one amplifyer only is used and each receiving frame in the corresponding galvanometric frame receives successively predetermined frequency through the intermediary of the amplifying detector. The effects obtained in no way differ from the preceding provided that the frequency of the interversions are at least sufficient for the needle of the Hertzian compass to follow the variations resulting from such change.

This frequency may be low or high without in any way changing the principle of the invention but will be very different from that which the resultant current of the detection of the dampened waves or modulated sustained waves may possess.

Fig. 5 illustrates diagrammatically installation for the reception of the high frequency fields due to radio electric emitters and the determination of the direction of such emitters owing to an interversion of low frequency.

The high frequency amplifier having five valves shown diagrammatically in Fig. 5 with tuned circuits and aperiodic circuits, may vary as well as the number of valves and according to the object desired. All the filaments of the valves whose feed polarity is indicated may advantageously be heated in parallel by any generator. The plates are brought to a high positive voltage, the positive of such high voltage being connected to the terminal marked +H and the negative pole to the positive pole of the filament. The amplifier assemblage is usefully placed in a Faraday cage connected to earth. The negative pole of the filament is advantageously earthed.

In order to obtain sensitivity and selectivity, the detector valve is followed by low frequency amplifying valves M and N with an aperiodic connecting system or with a low frequency resonance, which may be variable, shown by way of example, with a resonance connection in the diagram.

These amplifying valves amplify the low frequency current resulting from the detection of the high frequency current received, if such current is modulated, or the low frequency current generated by the beat with the incident wave, of a local wave generated by an adjustable and advantageously calibrated heterodyne O. The number of low frequency valves is by way of example fixed at two and vary according to the results it is desired to obtain.

The valve V which follows three low frequency valves has for this object to detect the low frequency current in order to deliver into the frames of the galvanometric indicator apparatus, a continuous current proportional to the low frequency current. The low frequency voltage is applied to the plate of such valve by a transformer T and the gap heated filament plate forms a valve while only allowing the current to circulate when the plate is positive with respect to the filament. The grid is brought to a positive potential with respect to the filament (by a battery B for example in the diagram) which has for effect to reduce within large limitation the internal resistance of the valve owing to the great attraction by the grid of the electrons coming from the filament.

In the absence of the low frequency voltage there is sometimes a light permanent continuous current in the plate circuit; in order to neutralize this the plate may be brought to a slightly negative potential with respect to the more negative portion of the filament owing to the slight fall of voltage produced by filament heating current in the resistance $R_2$ of suitable value. The continuous detector current proportional to the low frequency current traverses successively the frames of the galvanometric indicator arrangement by the action of commutations. These commutations which have for object electrically and successively to connect each receiving frame in the galvanometric frame which corresponds to it through the amplifier at a suitable frequency, are carried out in the manner shown diagrammatically in Fig. 5.

The receiving frames $C_1$ $C_2$ which are identical geometrically and electrically, and are perpendicular to one another, without any coupling between their circuits, are tuned upon the same received frequency by the variable condensers $D_1$ and $D_2$ which are simultaneously controlled. In the case of too sharp tuning the circuits are damped by equal resistance interpolated in the connections of the condensers to the frame.

The electric centres of the frames are earthed and connected to the negative pole of the battery or of the generator feeding the valve filaments. The frames are connected to four series of metallic blades $L_1$—$L_2$ $L_3$ $L_4$ arranged as fixed variable condenser plates in air, each series being shown diagrammatically by a plate in Fig. 5. The capacities existing between the four series neutralize each other and no electrostatic coupling exists between the frames. Moreover any accidental irregularity may be compensated for by a small auxiliary neutralizing capacity.

Between the plates of the series, two series of metal plates may turn freely without touching, each series being represented by one plate in Fig. 5 around a central axis of rotation perpendicular to the plane of the figure.

Each series of plates is isolated from the shaft and from the other series and connected to a ring upon which rubs a brush ensuring contact.

The series $l_1$ forms the capacity of attack of the grid of the first amplifier valve. It will be seen that when each series $l_1$ is arranged between the fixed plates $L_1$ and $L_2$ the amplifier receives and amplifies the oscillations existing in the frame $C_1$ while when $l_1$ is in $L_3$ and $L_4$ it is the oscillations in the frame $C_2$ which are amplified.

The second series of plates $l_2$ which causes complete symmetry of the circuits of the frames with the objects of absolute compensating for antenna effects, is connected to earth by the resistance $R_1$ causing a damping equal to that produced by the first amplifying valve connected to the series of plates $l_1$.

In order synchronously to short circuit one or other of the galvanometric frames $B_1$ and $B_2$ of the indicator apparatus, the shaft carrying the series of plates, also carries a collector having four blades and two rings; three brushes ensure electric contact which fulfills the function as is indicated diagrammatically in Fig. 5. The brushes E and G ensure a feed of current to the plates O—P—Q—R through the intermediary of the rings $b_1$ $b_2$. The brush K ensures short circuiting of one or other frame $B_1$, $B_2$. Its position is adjustable in order to ensure good synchronism of the commutations, the brush K rests on two plates simultaneously at the moment of the permutations, for a very short time substantially equal to the time taken by the blades $l_1$ $l_2$ to pass into the space which separates the series of fixed plates $L_1$ $L_2$ $L_3$ $L_4$.

During this time the two frames $B_1$ $B_2$ are short circuited and receive no current in order to prevent any cause of trouble.

The shaft is driven by a small electric motor or by any other means, the speed of rotation determining the frequency of the interversions.

Fig. 6 illustrates the commutator arrangement where the same parts are given the same letters of reference as in Fig. 7. The insulating materials are marked I. Fig. 7 is a section on the line a—b viewed as indicated by the arrow f.

The drive arrangement is placed at one end of the shaft. The assemblage is advantageously placed in an earthed Faraday cage.

The shape and application of this interversion apparatus with a rotating capacity commutator may be modified without altering the principle of the invention.

The amplifying and detecting arrangement illustrated in Fig. 5 may be modified in any manner as well as the commutator system employed without altering the scope of the invention.

The telephonic listener with an electromagnetic field of a direction such that the needle occupies the zero of the dial plate which indicates an equal reception intensity in the two frames is absolutely regulated. If the intensity of reception is the same in the two frames telephonic reception is modulated at the frequency of the interversions but in the main application of a Hertzian compass viz: its application to navigation, as the principle of its use is to maintain always the direction of travel so that the needle always indicates zero the reception of the waves from the Hertzian light house will therefore take place without deformation. Modulation is not audible if the frequency of the interversion is a high frequency.

The apparatus is also suitable for reading the direction of a radioelectric emitter as is hereinafter set out.

The bisecting line X of the receiver frames (Fig. 1) is normally orientated on the ground in the direction north-south the sector 1 being towards north. The dial plate of the Hertzian compass is orientated similarly (Fig. 1).

For navigation the direction X becomes merged with the axis of the ship or of the airplane, etc., the sector 1 being towards fore.

The receiving frames, secured together, are movable about a vertical axis. They carry a needle which is in the direction X in the sectors 1 and 3, and which is displaceable over a fixed circular dial plate graduated from 0° to 360°, the point 0-360 of the dial plate being on the direction $x$ in the sector 1.

For ordinary reading of the direction of an electromagnetic field the needle of the frames will therefore be upon the zero of its graduated dial plate and the Hertzian compass will indicate the direction to be found. By turning, however, the receiving frames the needles of the Hertzian compass can always be brought back upon the zero of its dial plate. The needle of the receiving frame will then indicate the direction sought for of the radioelectric emitter, if, on the displacement of the frames the neddle of the Hertzian compass makes a displacement in opposite direction. If this condition be not fulfilled, which is extremely easy immediately to see because the frames are turned, it is necessary to take another position on the receiving frames, giving the zero on the dial plate of the Hertzian compass, a position which will of course be at 90° to the first.

This system of working also allows a navigator to move forwards, by making a predetermined angle of route with the direction of the waves emitted, without in any way modulating telephonic reception by the interversions. It is sufficient to displace the zero of the needle of the receiving frames and to cause it to mark the angle of route in question to the left of the zero, if it be desired to take to the right, and to the right of zero if it be desired to take to the left. Of course count must be taken of error, usual quadrantal due to metallic masses on the boat or aircraft. One would then manoeuvre in such manner that the direction of navigation causes the needle of the Hertzian compass to return to zero, regard being had to the conditions already formulated relatively to the displacements respectively of the Hertzian compass and frame needles. If the angle of route is at 90° the navigator traces an arc of a circle around the emitter. If the emitter is distant, the line may be assimilated to a straight line for a small length.

If the angle of route is not at 90° the navigator describes an arc in spiral approaching or receding from the emitter.

In most cases a simple comparison of an ordinary compass and the Hertzian compass allows it to be known in which direction one should advance to come nearer the wave emitter when this is known as is usually the case.

To improve the apparatus in order for it directly to indicate the direction of the emitter whose waves it receives without any doubt of 180° and over a dial plate with a complete circumference of 360°, count must be taken of the following considerations—

First of all the mechanical connection of the galvanometric indicating apparatus should be improved as illustrated by way of example in Fig. 8 in order to allow the movable part to make complete turns. The three electric contacts necessary for the input of current into the two frames is provided for by three concentric cups containing mercury in which plunge very fine metal points.

The turning takes place about the steel point $p$ upon which the movable part rests through the intermediary of a sapphire or other hard stone.

The concentric cups containing mercury are shown in plan in Fig. 9.

The centre of gravity of the movable assemblage is some millimetres below the bearing point of the counterweights $c_1$ $c_2$ $c_3$ $c_4$ which serve at the same time as damping arrangements.

The indicating needle brought upon the movable part turns over a frame having an entire circumference of 360°. The axis of rotation passes through the centre of such circumference perpendicular to its plane.

In order that this needle may occupy definite positions over the whole frame, there must be in function of the azimuths currents in the frames $B_1$ and $B_2$, represented by two polar diagrams of Fig. 10, in which the portions of curves representing the function indicated by the dotted line represents a current circulating in opposite sense to a predetermined sense by a full line.

The two perpendicular receiving frames $C_1$ and $C_2$ receive high frequency currents which when the two frames are turned to the same frequency are shown in function of the azimuth of the emitter by the diagrams shown in Fig. 11 (functions in sines and cosines).

The portion A however of the diagrams only differs after detection from the portions B, as is necessary to obtain the diagrams shown in Fig. 10. The continuous current of the output of the amplifying valve retains a predetermined and constant direction in the portions A and B of the diagrams.

At high frequency, the difference between these portions consists in that the phase is reversed in portions B from what it is or has been when at the same instant in the portion A.

In order to make this difference apparent the system is combined with a vertical antenna which receives the electromagnetic fields in all directions with equal intensity and constant phase. This phase, in the tuned antenna is quadrature with the phases of the frames tuned upon the same frequency; the currents in the frames are brought in opposition or in phase with the antenna currents by the induction coupling $C_3$ in the diagram Fig. 10 and further explained.

The antenna reception diagram is shown in Fig. 12.

If the tension collected in the antenna is equal to the maximum tension in a frame and the tensions and phases of one frame and of the antenna are first composed then those of the other frame and the antenna, there is obtained two movable polar diagrams (Fig. 13) the tensions annulling one another for maximum reception in one frame (opposite phases) and adding for the maximum of the other (equal phases). These new diagrams then represent a constant phase.

If the two combinations: antenna, frame are branches each upon an amplifier of the type shown in Fig. 5 at the output of these two amplifier valves there will be continuous currents represented by the diagrams shown in Fig. 13 they will represent exactly the high frequency diagram because in this diagram the phase is constant.

Two diagrams similar to those of Fig. 10 are however required. It will be seen that these are obtained by cutting off two diagrams of Fig. 13 (considered in continuous current) the diagram Fig. 12 for the antenna alone (considered as continuous current-constant phase). If therefore a third amplifier equal to the two first, amplifying the oscillations of the antenna alone be considered then at the output from the three amplifiers there will be obtained diagrams Fig. 13 for the first two, Fig. 12 for the third which allow the diagram 10 to be obtained.

The two first amplifiers, amplifying the oscillations of the antenna-frame systems, will have their output branched each upon a galvanometric frame $B_1$, $B_2$. The third amplifier amplifying the oscillations of the antenna alone will deliver its output current to the two frames $B_1$ and $B_2$ but in opposite direction to the output currents from the two first amplifiers.

Under these conditions the galvanometric indicating apparatus will indicate, without any want of precision of 180°, the direction of the emitter station whose waves are received, over a complete dial plate of 360° having regard to a suitable angular adjustment of the fixed magnetic field and of the indicating needle.

The difficulty of providing three identical amplifiers is eliminated by the successive synchronous amplification at a predetermined frequency, in the same amplifier of diverse oscillations of the frames and of the antenna by sending into the galvanometric frames continuous detected currents where their successive actions are composed into single resultant action determining the same position of the needle with simultaneous action.

The interversion period is thus composed:—

1st quarter of period: Frame $C_1$ and antenna $A_1$, amplifier, frame $B_1$.

2nd quarter of period: Frame $C_2$ and antenna $A_1$, amplifier, frame $B_2$.

3rd quarter of period: Antenna $A_1$, amplifier, frame $B_1$ current reversed.

4th quarter of period: Antenna $A_1$, amplifier, frame $B_2$, current reversed.

This result is obtained with the following arrangement represented diagrammatically as for example in Fig. 14. The grid of the first amplifier valve, which is not illustrated because of identical principle with that shown in Fig. 5, is constantly controlled by the oscillations received by the tuned antenna $A_1$, through the variable connection capacity L, which allows the voltage applied to the grid to be varied. The antenna $A_1$ is symmetrical with respect to the axis of the frames.

The frames, shown differently for the sake of clearness are perpendicular to each other.

Each tuned receiving frame has a terminal connected to a series of fixed plates $L_5$ $L_6$ similar to those previously described and placed as indicated in the figure. A series of blades $l_3$, can turn freely between the fixed plates.

A brush rubbing over a ring ensures electric contact with the blades. The capacity between the blades and the fixed plates serves as connection capacity between the grid and the first amplifier valve and the two frames.

When the blades are situated between the fixed plates $L_5$ the grid receives simultaneously oscillations from the frame $C_1$ and from the antenna $A_1$.

The values of such oscillations and their phases are such that the receiving diagram is that shown on the left of Fig. 13.

When the blades $l_3$ are between the fixed plates $L_6$ the grid receives simultaneously the oscillations from the frame $C_2$ and those from the antenna $A_1$. The values of such oscillations and their phases are themselves such that the receiving diagram is that on the right of Fig. 13.

During half of the interversion period during which the series of blades is completely disengaged from the fixed plates, the grid receives only the oscillations from the antenna alone.

A turning commutator shown diagrammatically in Fig. 14, keyed upon the same shaft as the movable blades distributes current coming from the valve in the frames $B_1$ $B_2$ in the manner indicated above synchronously with the interversion affected by the turning blades in the high frequency circuits.

The object of the four plates upon which rubs the brush S (plates U. X. Y. Z.) is to short circuit successively each frame $B_1$ or $B_2$ in order to send into the desired frame the current from the valve generated by the oscillation of the frame antenna circuit or corresponding antenna alone.

The object of the two other plates connected to the four other plates as indicated (plates $U_1$, $X_1$) is to reverse the direction of circulation of the current coming from the valve into, the frames $B_1$ $B_2$, during the time at which the blades 13 are free from the fixed plates (amplification of the oscillations of the antenna alone).

All the valves are isolated from the axis.

The brush S is adjustable for ensuring synchronism of the commutations; at the moment of the permutations it short circuits $B_1$ and $B_2$ simultaneously during the very short period when it rests on the two blades simultaneously. This time is nearly equal to the time taken by the blades $l_3$ to pass from the series of fixed plates $L_5$ into the series $L_6$ or for becoming disengaged from the fixed plate. This is in order to avoid all causes of trouble.

Brushes $S_1$ and $S_2$ are also adjustable in order to ensure the inversion of the current at the required moment; the period during which it rests upon the two plates $U_1$ and $X_1$ simultaneously, is advantageously adjusted so as to be slightly less than the short circuiting period caused by brush S.

All other arrangements, under any form, will in no way modify the principle of the invention of the periods of successive actions allowing the simultaneous actions to be replaced similarly all different application of commutator for high frequency, with variable or rotating capacity, in one form or another, will in no way modify the genesis of the invention.

The condensor $D_3$ neutralizes the capacity coupling between the series of plates $L_5$ and $L_6$.

The compensation of the antenna effects in the frames is effected by earthing the electric centre of the frames, if useful, it may be effected in a more absolute manner on the principle of that of the commutator shown in Fig. 6. A new series of blades similar to $l_3$ placed further upon the shaft will turn in two new series of fixed plates and will penetrate and pass out at the same time as the series $L_3$ penetrate and pass out from the plates $L_5$ and $L_6$. The new fixed plates are connected to the free terminals of the frames, and pass out the blades function simultaneously with the plates fixed to the same frame. The new series of blades are connected to earth by a resistance of a value such that there is produced a damping equal to that produced by the valve connected to $l_3$. The commutator system will be driven by its shaft, by a small electric motor or by any other means.

Having now particularly described and ascertained the nature of my invention and in what manner the same is to be performed, I declare that what I claim is:—

1. In a radio direction finder having a pair of perpendicularly arranged coil antennæ operatively associated with correspondingly arranged galvanometric coils carrying a pointer, the combination of a common amplifier, and means for connecting each coil antenna to its corresponding galvanometric coil in alternate succession through the common amplifier.

2. The combination claimed in claim 1 in which a detector is combined with the amplifier to detect and deliver a predetermined frequency to the galvanometric coils.

3. In a radio direction finder having a pair of perpendicularly arranged coil antennæ operatively associated with correspondingly arranged galvanometric coils carrying a pointer, the combination of a common amplifier system including means for amplifying the received energy at a low frequency, and means for connecting each coil antenna to its corresponding galvanometric coil in alternate succession through the common amplifier.

4. In a radio direction finder having a pair of perpendicularly arranged coil antennæ operatively associated with correspondingly arranged galvanometric coils carrying a pointer, the combination of a common amplifier system including means for amplifying the received energy at a low frequency, and means for connecting each coil antenna to its corresponding galvanometric coil in alternate succession through the common amplifier, said connecting means comprising a pair of condenser plate elements connected one to each coil antenna, and a complementary condenser plate element connected to the input circuit of the amplifier system and arranged to form a condenser coupling with each of said pair of condenser plate elements in alternate succession.

5. In a radio direction finder having a pair of perpendicularly arranged coil antennæ operatively associated with correspondingly arranged galvanometric coils carrying a pointer, the combination of a common amplifier system including means for amplifying the received energy at a low frequency, and means for connecting each coil antenna to its corresponding galvanometric coil in alternate succession through the common amplifier, said connecting means comprising a pair of condenser plate elements connected one to each coil antenna, and a complementary condenser plate element connected to the input circuit of the amplifier system and arranged to form a condenser coupling with each of said pair of condenser plate elements in alternate succession, together with a commutator arranged to connect the output circuit of the amplifier system with each of said galvanometric coils in alternate succession synchronously with the operation of the condenser elements.

6. In a radio direction finder having a pair of perpendicularly arranged coil antennæ operatively associated with correspondingly arranged galvanometric coils carrying a pointer, the combination of a common amplifier, a condenser antenna, and commutating means arranged to successively connect through said common amplifier, firstly the condenser antenna and one of the coil antennæ to one of the galvanometric coils, secondly the condenser antenna and the other coil antenna to the other galvanometric coil, thirdly the condenser antenna alone to the first galvanometric coil, and fourthly the condenser antenna alone to the second galvanometric coil.

7. In a radio direction finder having a pair of perpendicularly arranged coil antennæ operatively associated with a pair of correspondingly arranged galvanometric coils carrying a pointer, the combination of a common detector, a condenser antenna, and commutating means arranged to successively connect, through said common detector, firstly the condenser antenna and one of the coil antennæ to one of the galvanometric coils, secondly the condense antenna and the other coil antenna to the other galvanometric coil, thirdly the condenser antenna alone to the first galvanometric coil in reverse direction, and fourthly the condenser antenna alone to the other galvanometric coil in reverse direction.

8. In a radio direction finder having a pair of perpendicularly arranged coil antennæ and a direction indicating pointer carried by a pair of perpendicularly arranged galvanometric coils pivoted on a common axis and each fed from one of the coil antennæ, the combination of a common detector, and means for alternately inserting the detector between each of said coil antennæ and its associated galvanometric coil.

In testimony whereof I affix my signature.

HENRI BUSIGNIES.